April 1, 1930. F. J. ARMSTRONG 1,752,770
ELECTRIC CIRCUIT CONTROL LOCK SWITCH DEVICE FOR AUTOMOBILES
Filed April 17, 1925   2 Sheets-Sheet 2
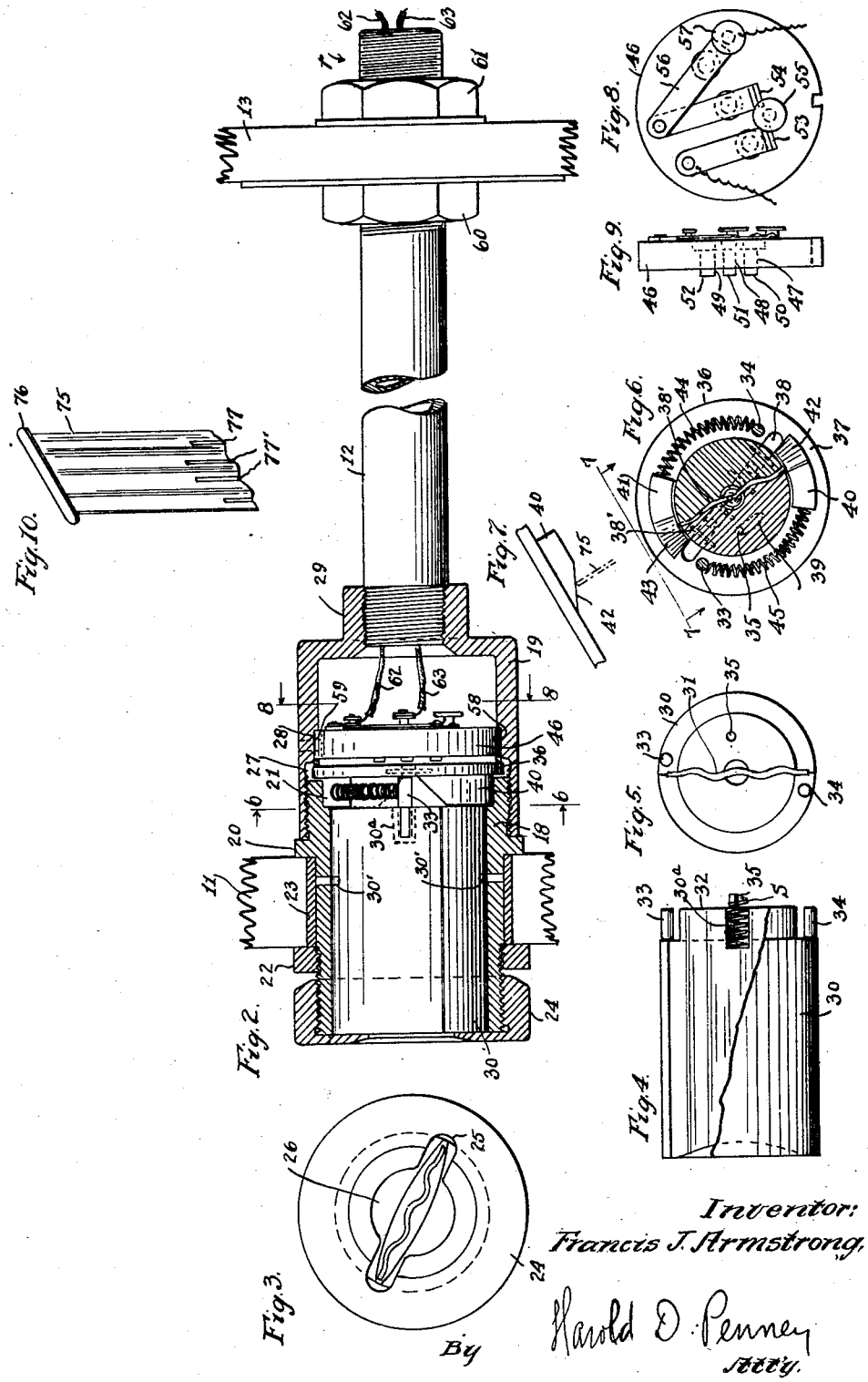
Inventor:
Francis J. Armstrong,
By Harold D. Penney
Atty.

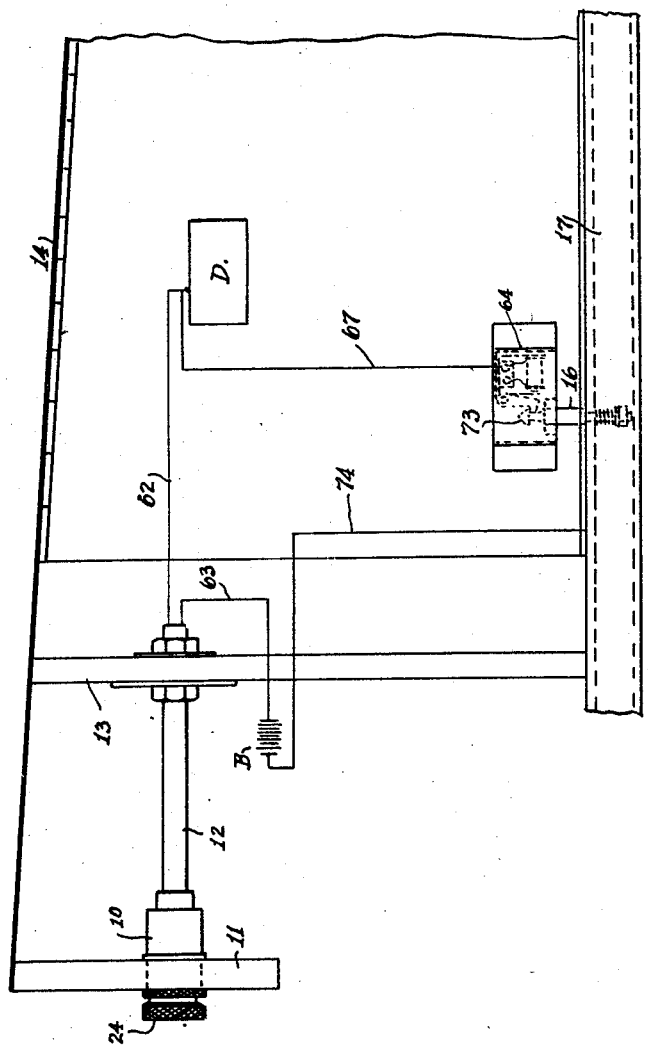

Patented Apr. 1, 1930

1,752,770

UNITED STATES PATENT OFFICE

FRANCIS J. ARMSTRONG, OF BROOKLYN, NEW YORK, ASSIGNOR TO D. STEWART CRAVEN, OF SALEM, NEW JERSEY

ELECTRIC-CIRCUIT CONTROL LOCK-SWITCH DEVICE FOR AUTOMOBILES

Application filed April 17, 1925. Serial No. 23,831.

The present invention relates to electric circuit control devices and particularly to such devices when applied to a motor vehicle, and one object of the invention is to provide an electric circuit control device for controlling the ignition circuit of a motor vehicle and comprising a hood lock of which the electric circuit for operating the lock is controlled by the device.

Another object is to provide an electric circuit control device comprising a hood lock included in the circuit controlled by said device, the circuit for operating the hood lock being connected only for the purpose of unlocking the lock and being at all other times broken and thereby conducive to the saving of electricity.

Another object is to provide an electric circuit control device comprising a hood lock included in the circuit controlled by the device, the device being provided with a removable key which when removed from the device breaks the ignition circuit for protecting the vehicle against unauthorized persons and also renders it impossible to connect the circuit for unlocking the hood lock, the hood lock thus cooperating with the device in the protection of the vehicle.

Another object is to provide a key of peculiar shape for the purpose of above mentioned which is insertable in and conforms to the shape of a protective slot or key hole, thereby increasing the difficulty of operation of the device by unauthorized persons.

Another object is to provide a key for the purpose mentioned which when in operative position in the device is always under the influence of means for automatically ejecting the key from the device for thereby breaking the circuit, the key being retained in operative position by means operated by the driver, the intention being that when the driver wishes to leave the vehicle protected by the device he must of necessity release said retaining means whereupon the circuit is broken by automatic ejection of the key from operative position, thus preventing forgetfulness on the part of the driver to remove the key when the ignition circuit is broken for protecting the vehicle, the arrangement being such that the key will be ejected into the hand of the driver when he releases said retaining means.

These objects, and such other objects as may later appear herein, are attained by the invention, one of the many possible embodiments of which is described by way of example in the subjoined specification and shown in the drawing accompanying the specification in which:

Fig. 1, is a diagrammatic view of the ignition circuit control and hood lock mechanism assembled on a motor vehicle.

Fig. 2, is a view of the switch mechanism of the circuit control device, partly in section.

Fig. 3, is a front end view of said switch mechanism.

Fig. 4, is a side view of the switch mechanism cylinder, one side thereof being partly broken away.

Fig. 5, is an end view of the switch mechanism cylinder.

Fig. 6, is a sectional view on the line 6—6 of Fig. 2 looking in the direction of the arrows of the section line and showing the shifting block or disk of the switch mechanism.

Fig. 7, is a fragmental view of one of the lugs of the shifting block or disk looking in the direction of the arrows 7—7 of Fig. 6.

Fig. 8, is a view of the switch block or disk looking in the direction of the arrows 8—8 of Fig. 2.

Fig. 9 is a side view of the switch block or disk.

Fig. 10, is a perspective view of the key for the lock.

Similar reference characters denote similar parts throughout the several views.

Referring to Fig. 1, the invention comprises generally the switch mechanism 10 mounted on the instrument board 11 of the motor vehicle, the connecting conduit 12 passing through the dash 13 of the motor vehicle, the battery B, the distributor D under the hood 14, the lock mechanism 15 secured to the hood, the bolt 16 secured to the frame 17, and the operatively connecting wires and key for the lock. For brevity of description and convenience of illustration only one hood lock is shown although two hood locks are used, one on each side of the hood. One of the connecting wires is shown as leading from the hood lock to the distributor, and thence by way of the conduit to the switch mechanism. Another wire leads by way of the conduit from the switch mechanism to a switch, not shown, or to the battery and from the battery to a ground on the frame.

Referring to Figs. 2 to 10, the switch mechanism 10 comprises the cylinder casing 18 and the switch casing 19, both of steel or other suitable metal adapted to resist violence. The cylinder casing 18 is exteriorly threaded at its outer and inner ends, the end on the exposed side of the instrument board 11 being termed the outer end for purposes of description, and has adjacent to the thread on its inner end the annular offset or abutment 20 and has at its inner opening the annular recessed portion 21 for the purpose later stated. The lock ring 22 threadedly engages the outer end of the cylinder casing and bears against the outer face of the instrument board 11, the instrument board being received in the space between the offset 20 and the lock ring and spaced away from the cylinder casing by the band 23. The cap 24 threadedly engages the outer end of the cylinder casing 18 and has extending through its face the slot or opening 25 having the enlarged substantially circular portion 26, the cap 24 being of steel or other suitable metal.

The switch casing 19 is interiorly threaded at its outer end to engage the inner end of the cylinder casing and has at the inner end of its interior thread the annular recess 27 and adjacent thereto the annular recess 28, the purpose of both these recesses being later stated. The switch casing has on one end, the inner end, the reduced interiorly threaded extension 29, for receiving one end of the conduit 12.

The cylinder 30, Figs. 4 and 5, preferably is made of complemental parts and fits snugly in the interior of the cylinder casing being prevented from turning therein by the pins 30', and is provided with the longitudinally extending corrugated slot or opening 31, one half of which is formed in each part of the cylinder when the cylinder is of complemental parts, the purpose of the slot or opening being later stated. The cylinder 30 has at one end, the inner end, the reduced cylindrical extension 32, and is provided on said extension at its margins with the oppositely disposed pins 33 and 34, one of these pins being on each part of the cylinder when the same is of complemental parts, the ends of the pins 33 and 34 being in line with the end face of the extension 32. The extension 32 is provided on its end face with the intramarginal pin 35.

The shifting block or disk 36, Fig. 6, comprises the plate portion 37 having the diametric slot or opening 38 and the elliptical slot 39 therethrough, the slot or opening 38 having therein the transverse baffle pins 38' and having on its outer face, outer relative to the cap 24, the opposed lugs 40 and 41 provided with inclined faces 42 and 43 extending in opposite directions and terminating at the adjacent edges of the slot or opening 38. Springs 44 and 45 bear at one of their ends against the vertical end faces of the lugs 40 and 41 and are secured at their opposite ends to the marginal pins 33 and 34 of the cylinder 30, it being borne in mind that Fig. 6 is taken on the line 6—6 of Fig. 2, the tendency of these springs being to retain the slot or opening 38 of the block or disk 36 out of registration with the slot 31 of the cylinder 30 when the key, later described, is removed from the opening of the cap 24, the intramarginal pin 35 of the cylinder engaging in the slot 39 of the block or disk 36 and constituting a stop for limiting the shift or throw thereof, the lugs 40 and 41 when the block or disk is in operative position being received in the recess 21 of the cylinder casing and the plate portion 37 being received in the recess 27 of the switch casing.

The switch block or disk 46 is of dielectric material having the series of alined holes 47, 48 and 49 therethrough in which the outwardly extending slidable dielectric pins 50, 51 and 52 are arranged for pressing thereon to engage the spring contact arms 53 and 54 with the contact member or post 55 and the contact arm 56 with the contact member or post 57 located on the inner face of the disk. The block or disk 46 is received in the recess 28 of the switch casing 19, being secured therein against turning as by the pins 58 and 59 the pins 50, 51 and 52 being arranged to lie in the line of the slot 38 of the shifting block when the block is shifted so that the slot 38 registers with the slot or opening 31 of the cylinder 30.

The conduit 12 which is of steel or other suitable metal extends inwardly towards the hood from the switch casing 19 through the dash 13 of the motor vehicle and is secured to the dash as by the nuts 60 and 61 and has passing through it the wires 62 and 63, the wire 62 being secured to the contact arm 53 and the wire 63 being secured to the contact member or post 57 of the switch block or disk.

The key 75 is of electrically conductive metal and is card shaped, the body of the key being corrugated as shown and this corrugation conforming to the corrugated slot or opening 31 of the cylinder 30 so that the key will enter and pass through this slot or opening. The key has the head 76 for preventing insertion of the key too far in the corrugated opening 31 of the shifting disk, and has at its opposite end the outer cuts or recesses 77 intended to avoid the outer baffle pins 38' of the cylinder 36, and the intermediate cuts or recesses 77' for receiving the helix spring S later described and avoiding the intermediate baffle pins 38' of the shifting disk.

The cylinder 30 has therein the axial recess 30ª in which the spring S is disposed, this spring bearing at one end against the end wall of the recess 30ª and at its other end against the outer face of the shifting disk 40 and being received in the cuts 77' of the key 75 and compressed thereby when the key is inserted in the slot 31 of the cylinder 30, and while permitting the end of the key to be brought into contact with the pins 50, 51 and 52 of the switch disk has the tendency to eject the key from the slot 31.

When the key 75 is inserted in the cap 24 and pushed inwardly the bottom edge of the key engages the inclined faces 42 and 43 of the lugs of the shifting block and thereby shifts the block so that the slot or opening 38 registers with the slot or opening 31 of the cylinder 30; when the key is pushed still further inwardly the recesses 77 avoid the transverse baffle pins 38', of the shifting block and the bottom edge of the key comes into contact with the pins 50, 51 and 52 of the switch block and forces them inwardly thereby bringing the contact arms 53 and 54 into contact with the contact member 55 and the contact arm 56 into contact with the contact member 57, thus, if the key is allowed to remain in position, connecting the ignition circuit and permitting operation of the motor. The key is retained in operative position by turning the cap 24 so that the key is held in place by its end 76 bearing against the under side of the cap adjacent to the slot 25. The hood lock is maintained locked, the key is withdrawn by turning the cap 24 so that the end 76 of the key is in alinement with the slot 25 of the cap and then is ejected by pressure of the spring S into the hand of the driver.

Having thus described my invention, it should be understood that there may be modifications thereof and variations therein without departing from the spirit of the invention, or exceeding the scope of the appended claims.

What I claim and desire to protect by Letters Patent is:

1. In an electric circuit control device comprising a switch mechanism having a cylinder provided with an irregularly contoured opening therethrough and a shiftable disk provided with a slot registerable with one end of said opening by shifting the disk, and baffle means across the slot, a key having an irregularly contoured body portion conforming to said opening for insertion therein for passing therethrough to shift the shifting disk and having means for avoiding said baffle means for entering the slot of the shifting disk for operating the switch mechanism.

2. In an electric circuit control device comprising a switch mechanism having a cylinder provided with an irregularly contoured opening therethrough and a shifting disk provided with a slot registerable with one end of said opening by shifting the disk and lugs adjacent to the slot and baffle means across the slot, a key having an irregularly contoured body portion conforming to said opening for insertion therein for passing therethrough to engage said lugs for shifting said disk and having means for avoiding said baffle means for entering the slot of the shifting disk for operating the switch mechanism.

3. In an electric circuit control device, a switch mechanism having a cylinder provided with an irregularly contoured opening therethrough and a shiftable disk provided with a slot registerable with one end of said opening by shifting the disk, and baffle means across the slot, a key having a body portion conforming to the irregular contour of said opening for insertion therein for operating the switch mechanism.

4. In an electric circuit control device, a switch mechanism having a cylinder provided with an irregularly contoured opening therethrough and a shiftable disk provided with a slot registerable with one end of said opening by shifting the disk and lugs associated with said disk and adjacent to the slot a key having a corrugated body portion conforming to said opening for insertion therein for engagement with said lugs for shifting said disk, thereby operating the switch mechanism.

5. In an electric circuit control device, a switch mechanism having a cylinder provided with an irregularly contoured opening therethrough and a shiftable disk provided with a slot, registerable with one end of said opening by shifting the disk, and baffle means across the slot, a key having an irregularly contoured body portion conforming to said opening for insertion therein for passing therethrough to shift the shifting disk and having means for avoiding said baffle means for entering the slot of the shifting disk for operating the switch mechanism and means for automatically ejecting the key from said casing for breaking the electric circuit.

6. In an electric circuit control device, a switch mechanism having a cylinder provided with an irregularly contoured opening therethrough and a shiftable disk provided with a slot registerable with one end of said opening by shifting the disk, and baffle means across the slot, a key having an irregularly contoured body portion conforming to said opening for insertion therein for passing therethrough to shift the shifting disk and having means for avoiding said baffle means for entering the slot of the shifting disk for operating the switch mechanism, releasable means for retaining the key in said slot, and means for automatically ejecting the key from said slot for breaking the electric circuit when said retaining means is released.

7. In an electric circuit control device, a switch mechanism having a cylinder provided with an irregularly contoured opening therethrough and a shiftable disk provided with a slot registerable with one end of said opening by shifting the disk and baffle means across the slot, a key insertible in said opening and conforming to the shape thereof for closing the electric circuit, and means for automatically ejecting the key from said slot for breaking the electric circuit.

Signed at New York, in the county of New York and State of New York, this 16 day of April, A. D. 1925.

FRANCIS J. ARMSTRONG.